(12) United States Patent
Liu et al.

(10) Patent No.: US 7,430,115 B2
(45) Date of Patent: Sep. 30, 2008

(54) APPARATUS FOR MOUNTING REMOVABLY A DISK DRIVE IN AN ELECTRONIC DEVICE

(75) Inventors: Kuo-Kuang Liu, Nan-Tou Hsien (TW); Yu-Chen Chu, Taichung Hsien (TW)

(73) Assignee: Universal Scientific Industrial Co., Ltd. (TW)

( * ) Notice: Subject to any disclaimer, the term of this patent is extended or adjusted under 35 U.S.C. 154(b) by 225 days.

(21) Appl. No.: 11/372,786

(22) Filed: Mar. 10, 2006

(65) Prior Publication Data

US 2007/0211424 A1    Sep. 13, 2007

(51) Int. Cl.
*H05K 7/16* (2006.01)

(52) U.S. Cl. .................... 361/685; 361/754; 312/223.2

(58) Field of Classification Search ............... 361/685, 361/754; 312/223.2
See application file for complete search history.

(56) References Cited

U.S. PATENT DOCUMENTS 5,305,180 A * 4/1994 Mitchell et al. ............. 361/685
6,510,051 B2 * 1/2003 Kim ........................... 361/686
6,643,139 B2 * 11/2003 Tien ........................... 361/727

* cited by examiner

*Primary Examiner*—Jayprakash N Gandhi
*Assistant Examiner*—Ingrid Wright
(74) *Attorney, Agent, or Firm*—Ostrolenk, Faber, Gerb & Soffen, LLP (57) ABSTRACT

An apparatus includes a casing and a latch unit. The latch unit includes first and second latch members, first and second interlocking members, a driving member, and an operating member. The first latch member is provided on a disk drive. The first interlocking member is formed on the first latch member. The second latch member is pivoted to the casing, and is rotatable relative to the casing between latched and unlatched positions. The second interlocking member is formed on the second latch member, and engages releasably the first interlocking member when the disk drive is received in the casing and when the second latch member is disposed at the latched position. The driving member is pivoted to the casing. The operating member is pivoted to the casing, and is operable so as to drive rotation of the second latch member to the unlatched position through the driving member.

13 Claims, 10 Drawing Sheets

APPARATUS FOR MOUNTING REMOVABLY A DISK DRIVE IN AN ELECTRONIC DEVICE

BACKGROUND OF THE INVENTION

1. Field of the Invention

The invention relates to an apparatus for mounting removably a disk drive in an electronic device.

2. Description of the Related Art

Figure 1:
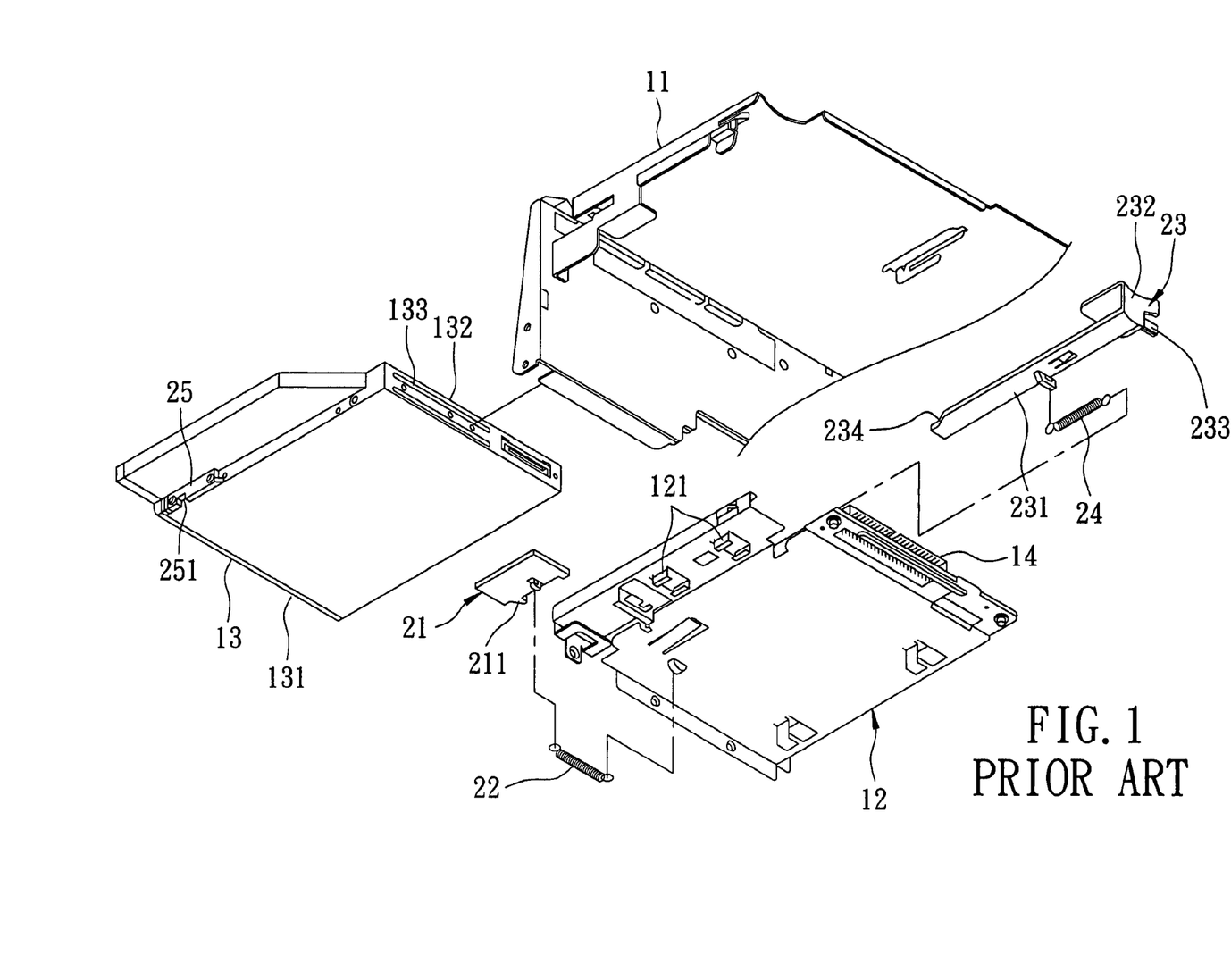
FIG. 1 is a fragmentary exploded perspective view of a conventional apparatus for mounting removably a disk drive in an electronic device.

Apparatuses that permit installation and removal of a disk drive, such as a thin-type optical disk drive, in and from an electronic device, such as a personal computer, without the use of a tool are well known. One such known apparatus is disclosed in Taiwanese Utility Model M260829. As shown in FIG. 1, the known apparatus includes a disk drive casing 12, an electrical connector 14, and a latch unit.

The disk drive casing 12 serves to receive a disk drive 13 therein, and is mounted securely on a disk drive bay 11 of an electronic device (not shown).

The disk drive 13 has a front end 131, and a rear end 132 that is opposite to the front end 131 thereof and that is provided with a terminal 133.

The electrical connector 14 is provided on the disk drive casing 12, and is coupled electrically to the terminal 133 of the disk drive 13 when the disk drive 13 is received in the disk drive casing 12.

Figure 2:
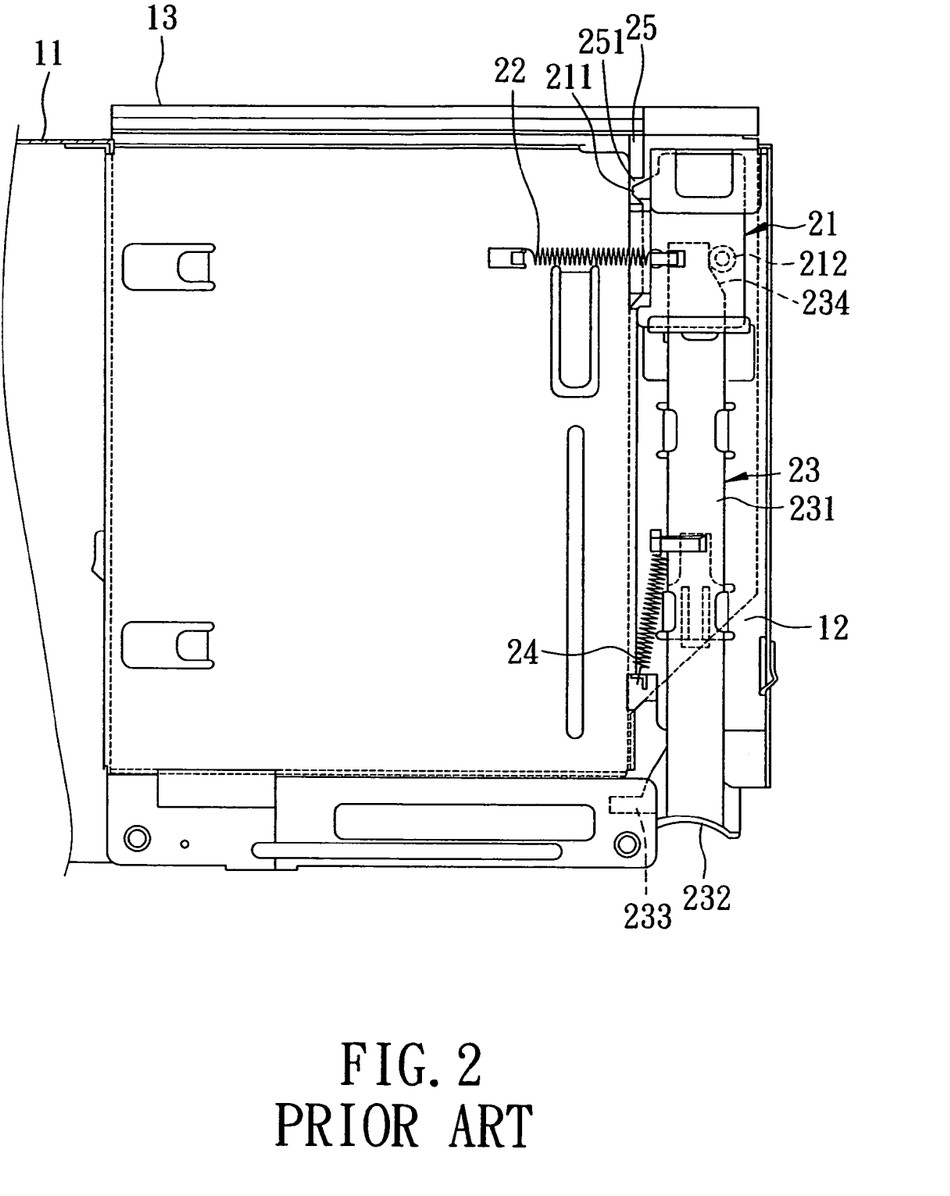
FIG. 2 is a fragmentary schematic view of the conventional apparatus to illustrate a state where a latch unit thereof is disposed at a latched position.
Figure 3:
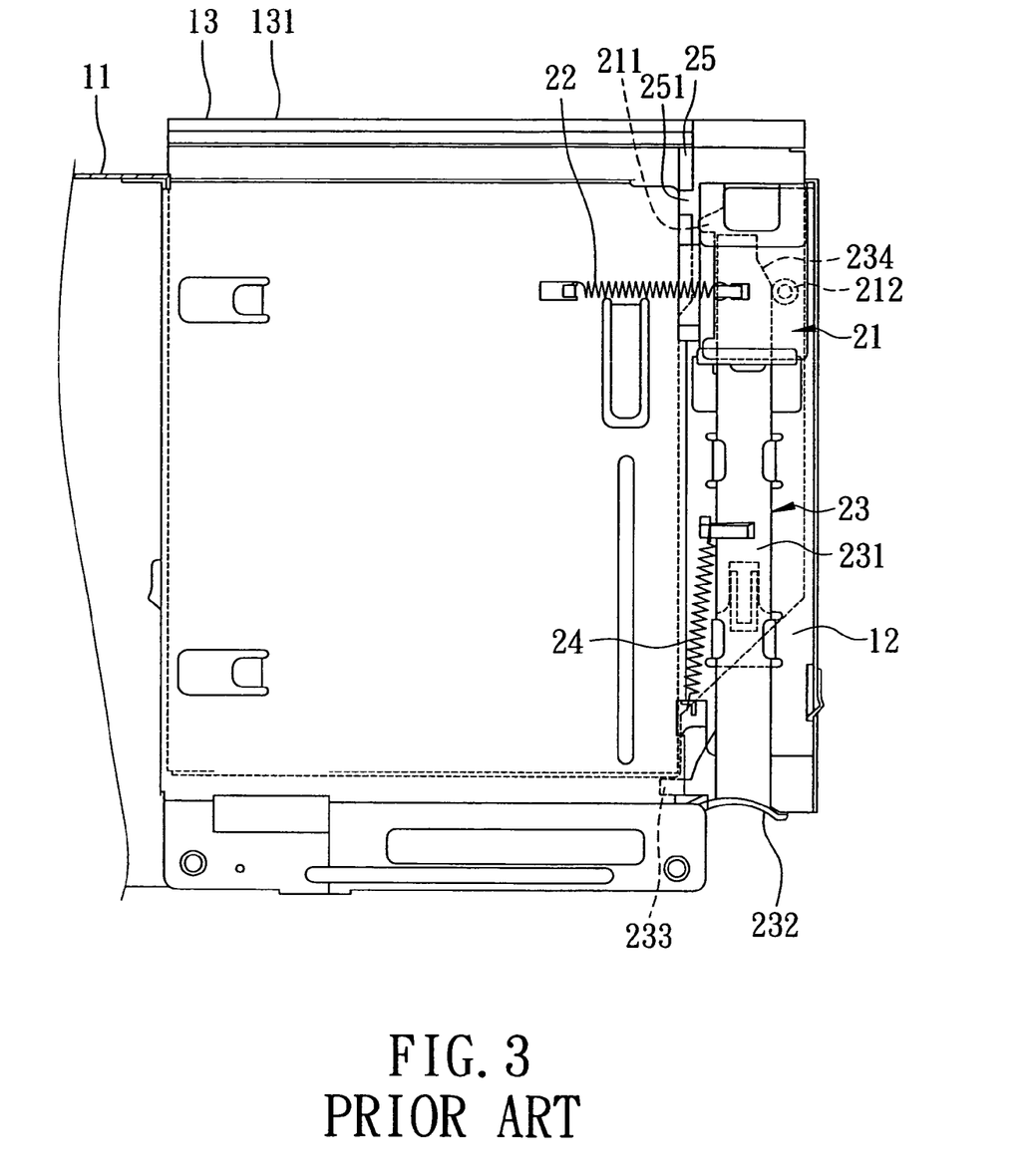
FIG. 3 is a fragmentary schematic view of the conventional apparatus to illustrate a state where the latch unit thereof is disposed at an unlatched position.

The latch unit serves to retain removably the disk drive 13 in the disk drive casing 12. In particular, the latch unit includes first and second latch members 25, 21, first and second interlocking members 251, 211, and an operating member 23. The first latch member 25 is provided on a lateral side of the disk drive 13. The first interlocking member 251 is in the form of an engaging groove that is formed in the first latch member 25. The second latch member 21 is mounted movably on the disk drive casing 12. The second interlocking member 211 is in the form of an engaging protrusion that is formed on the second latch member 21. The second latch member 21 is movable relative to the disk drive casing 12 between a latched position, where the second interlocking member 211 engages the first interlocking member 251, thereby retaining releasably the disk drive 13 in the disk drive casing 12, as best shown in FIG. 2, and an unlatched position, where the second interlocking member 211 disengages from the first interlocking member 251, thereby permitting removal of the disk drive 13 from the disk drive casing 12, as best shown in FIG. 3.

The latch unit further includes a first biasing member 22 for biasing the second latch member 21 to the latched position.

The operating member 23 is mounted movably on the disk drive casing 12, and has a middle portion 231, and first and second end portions 234, 233 that extend in different directions from the middle portion 231. The operating member 23 is movable relative to the disk drive casing 12 in a first axial direction, and a second axial direction opposite to the first axial direction.

The latch unit further includes a guide 121 that is connected slidably to the middle portion 231 of the operating member 23 for guiding movement of the operating member 23 in the first and second axial directions.

The latch unit further includes a cam arrangement that permits movement of the second latch member 21 to the unlatched position against the biasing action of the first biasing member 22 when the operating member 23 is moved in the first axial direction, and that permits movement of the second latch member 21 to the latched position when the operating member 23 is moved in the second axial direction. The cam arrangement includes a cam formed on the first end portion 234 of the operating member 23, and a cam follower 212 provided on the second latch member 21.

The latch unit further includes a second biasing member 24 for biasing the operating member 23 in the second axial direction.

The operating member 23 further has a push portion 232 that extends from the middle portion 231 thereof for facilitating movement of the operating member 23 in the first axial direction against the biasing action of the second biasing member 24.

The second end portion 233 of the operating member 23, as illustrated in FIG. 3, pushes the rear end 132 of the disk drive 13 so as to disconnect the terminal 133 of the disk drive 13 from the electrical connector 14 when the operating member 23 is moved in the first axial direction.

Although the aforementioned known apparatus can achieve its intended purpose, the latch unit of the known apparatus is complicated in structure. In addition, a relatively large pushing force is required to be applied to the push portion 232 of the operating member 23 in order to disconnect the terminal 133 of the disk drive 13 from the electrical connector 14.

SUMMARY OF THE INVENTION

Therefore, the object of the present invention is to provide an apparatus that serves to mount removably a disk drive in an electronic device, that has a simplified latch unit for retaining releasably the disk drive therein, and that can be operated with minimal force to remove the disk drive.

According to the present invention, an apparatus for mounting removably a disk drive in an electronic device that has an opening comprises a disk drive casing, an electrical connector, and a latch unit. The disk drive has a front end, and a rear end that is opposite to the front end thereof and that is provided with a terminal. The disk drive casing is adapted to receive the disk drive therein and is adapted to be mounted in the electronic device. The electrical connector is provided in the disk drive casing, and is adapted to be coupled electrically to the terminal of the disk drive when the disk drive is received in the disk drive casing. The latch unit is adapted for retaining releasably the disk drive in the disk drive casing, and includes first and second latch members, first and second interlocking members, a driving member, and an operating member. The first latch member is adapted to be provided on the disk drive. The first interlocking member is formed on the first latch member. The second latch member is mounted pivotally on the disk drive casing, and is rotatable relative to the disk drive casing between latched and unlatched positions. The second interlocking member is formed on the second latch member, and engages releasably the first interlocking member when the electrical connector is connected to the terminal of the disk drive and when the second latch member is disposed at the latched position. The driving member has first and second end portions, and a pivot portion that is disposed between the first and second end portions of the driving member and that is mounted pivotally on the disk drive casing. The driving member is rotatable relative to the disk drive casing in a first rotational direction such that the first end portion of the driving member drives rotation of the second latch member from the latched position to the unlatched position. The operating member has a pivot portion that is pivoted to the disk drive casing, and connecting and push portions that extend in different directions from the pivot portion of the operating member. The connecting portion of the operating member is coupled to the second end portion of the driving member. The push portion is adapted to be disposed adjacent to the rear end of the disk drive when the disk drive is received in the disk drive casing. The operating member is operable to rotate in a second rotational direction opposite to the first rotational direction so as to drive rotation of the driving member in the first rotational direction such that the push portion of the operating member pushes the rear end of the disk drive so as to disconnect the terminal of the disk drive from the electrical connector.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
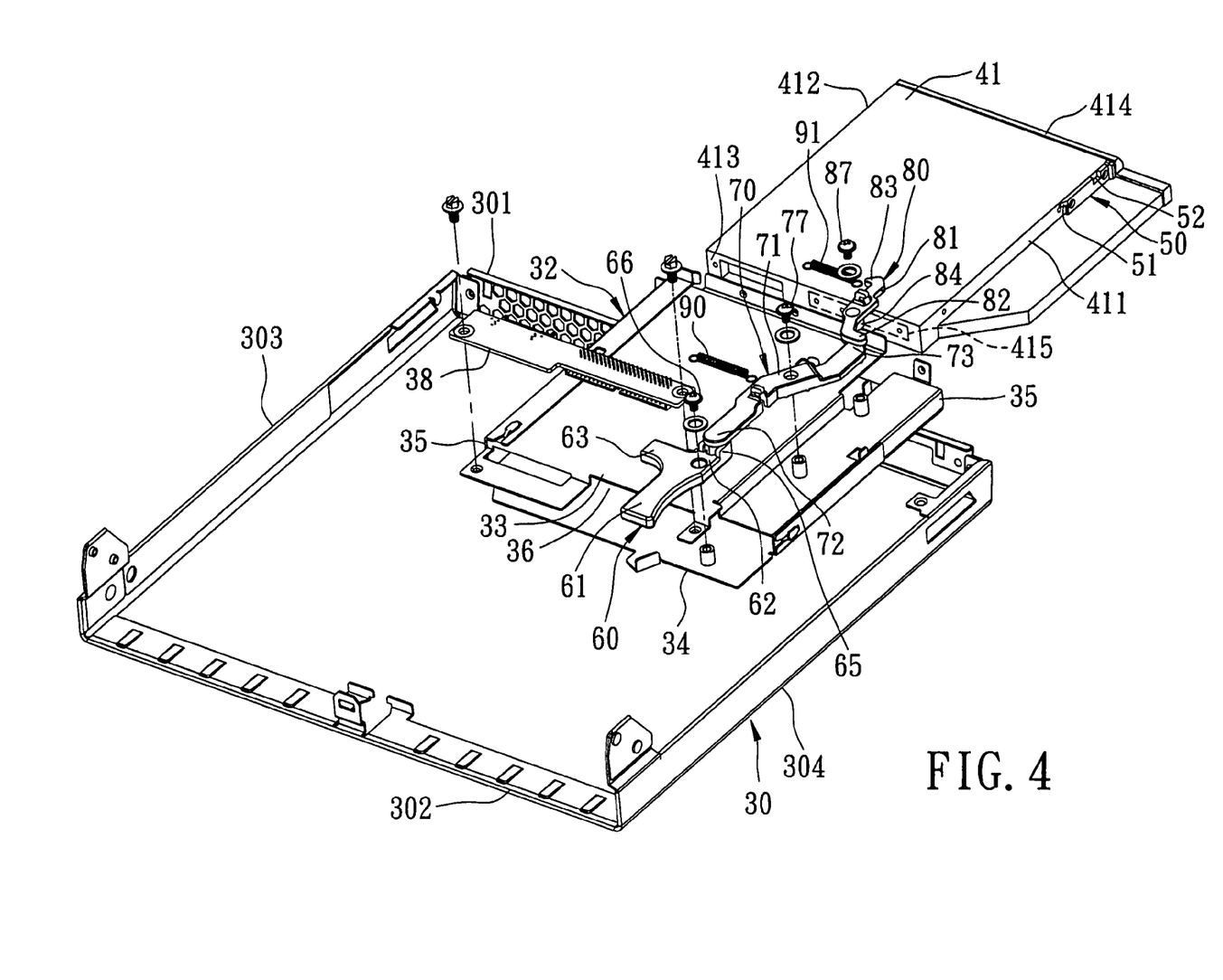
FIG. 4 is an exploded perspective view of the preferred embodiment of an apparatus for mounting removably a disk drive in an electronic device according to the present invention.

Referring to FIG. 4, the preferred embodiment of an apparatus according to this invention is shown to include a disk drive casing 32, an electrical connector 38, and a latch unit.

The apparatus of this embodiment is applicable for mounting removably a disk drive 41, such as a thin-type optical disk drive, in an electronic device 30, such as a personal computer, in a manner that will be described hereinafter.

The electronic device 30 includes a disk drive bay (not shown), and has opposite front and rear ends 301, 302, and opposite left and right ends 303, 304. The front end 301 of the electronic device 30 is formed with an opening.

The disk drive 41 has opposite front and rear ends 414, 413, and left and right ends 412, 411. The rear end 413 of the disk drive 41 is provided with a terminal 415.

The disk drive casing 32 is mounted securely on the disk drive bay of the electronic device 30 and corresponds to the shape of the disk drive 41. In this embodiment, the disk drive casing 32 includes top and bottom casing parts 33, 34, and opposite lateral casing parts 35, each of which interconnects the top and bottom casing parts 33, 34. The top and bottom casing parts 33, 34, and the lateral casing parts 35 cooperatively define an accommodating space 36 for receiving the disk drive 41 therein.

The opening in the front end 301 of the electronic device 30 is in spatial communication with the accommodating space 36 in the disk drive casing 32. The electrical connector 38 is mounted on a rear end of the disk drive casing 32, and is connected electrically to the terminal 415 of the disk drive 41 when the disk drive 41 is received in the accommodating space 36 in the disk drive casing 32.

The latch unit serves to retain releasably the disk drive 41 in the accommodating space 36 in the disk drive casing 32. In particular, the latch unit includes first and second latch members 50, 80, first and second interlocking members 52, 83, a driving member 70, and an operating member 60.

The first latch member 50 of the latch unit is fastened to the right end 411 of the disk drive 41, and has an end portion that is formed with a chamfer 51.

In this embodiment, the first interlocking member 52 of the latch unit is in the form of an engaging groove that is formed in the first latch member 50.

The second latch member 80 has first and second end portions 81, 82, and a pivot portion 84 that is disposed between the first and second end portions 81, 82 of the second latch member 80 and that is mounted pivotally on the top casing part 33 of the disk drive casing 32. The second latch member 80 is rotatable relative to the disk drive casing 32 about a pivot pin 87 between latched and unlatched positions.

In this embodiment, the second interlocking member 83 is in the form of an engaging protrusion that is formed on the first end portion 81 of the second latch member 80, and engages releasably the first interlocking member 52 when the terminal 415 of the disk drive 41 is connected to the electrical connector 38 and when the second latch member 80 is disposed at the latched position.

The latch unit further includes a first biasing member 91 for biasing the second latch member 80 to the latched position. In particular, the first biasing member 91 is a compression spring, and has a first end that is connected to the first end portion 81 of the second latch member 80, and a second end that is connected to the top casing part 33 of the disk drive casing 32.

The driving member 70 has first and second end portions 73, 72, and a pivot portion 71 that is disposed between the first and second end portions 73, 72 of the driving member 70 and that is mounted pivotally on the top casing part 33 of the disk drive casing 32. The driving member 70 is rotatable relative to the disk drive casing 32 about a pivot pin 77 in a first rotational direction, i.e., counter-clockwise direction, such that the first end portion 73 of the driving member 70 drives rotation of the second latch member 80 from the latched position to the unlatched position against biasing action of the first biasing member 91.

Figure 5:
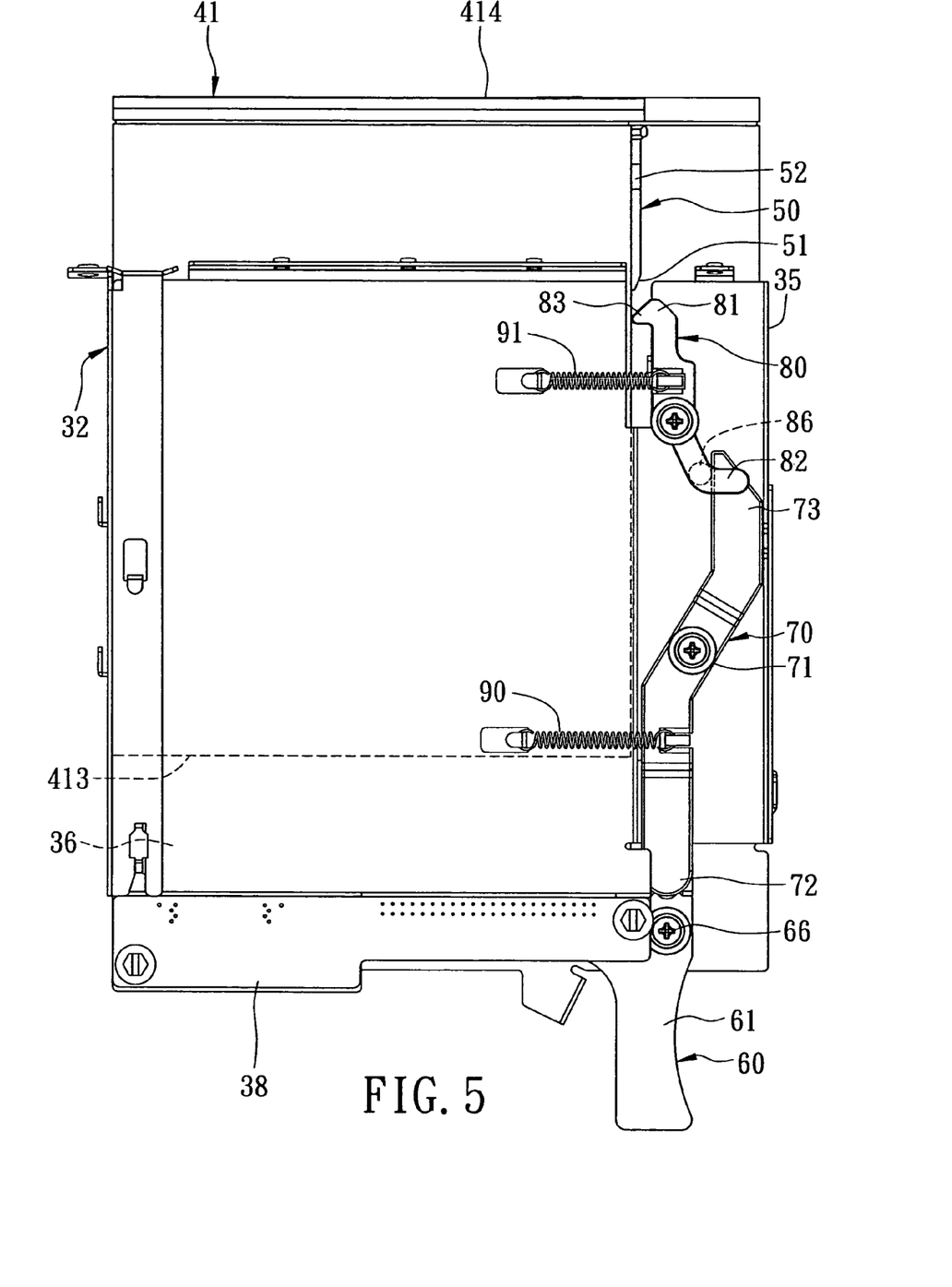
FIGS. 5 to 8 are schematic views to illustrate operation of the latch unit of the preferred embodiment during installation of the disk drive in the electronic device.

As best shown in FIG. 5, the second end portion 82 of the second latch member 80 is formed with a stud 86 that is pushed by and that slides along the first end portion 73 of the driving member 70 when the driving member 70 is rotated in the counter-clockwise direction.

The latch unit further includes a second biasing member 90 for biasing the driving member 70 in a second rotational direction, i.e., clockwise direction, opposite to the first rotational direction. In particular, the second biasing member 90 is a compression spring, and has a first end that is connected to the second end portion 72 of the driving member 70, and a second end that is connected to the top casing part 33 of the disk drive casing 32.

The operating member 60 has a pivot portion 62 that is pivoted to the bottom casing part 34 of the disk drive casing 32, and connecting and push portions 65, 63 that extend in different directions from the pivot portion 62 of the operating member 60.

The connecting portion 65 of the operating member 60 extends toward the front end 301 of the electronic device 30, and is coupled to the second end portion 72 of the driving member 70 through a tongue-and-groove arrangement. The tongue-and-groove arrangement includes a groove that is formed in the connecting portion 65 of the operating member 60, and a tongue that is provided on the second end portion 72 of the driving member 70.

The push portion 63 of the operating member 60 extends toward the left end 303 of the electronic device 30, and is disposed adjacent to the rear end 413 of the disk drive 41 when the terminal 415 of the disk drive 41 is connected to the electrical connector 38.

The operating member 60 is operable to rotate in the clockwise direction relative to the disk drive casing 32 about a pivot pin 66 such that the driving member 70 rotates in the counter-clockwise direction against the biasing action of the second biasing member 90, and such that the push portion 63 of the operating member 60 pushes the rear end 413 of the disk drive 41 so as to disconnect the terminal 415 of the disk drive 41 from the electrical connector 38 and so as to dispose the front end 414 of the disk drive 41 externally of the electronic device 30 through the opening in the front end 301 of the electronic device 30.

The operating member 60 further has an operating portion 61 that extends from the pivot portion 62 of the operating member 60 toward the rear end 302 of the electronic device 30 for facilitating operation of the operating member 60.

It is noted herein that, in an alternative embodiment, the latch unit may be dispensed with the first and second biasing members 91, 90.

Figure 6:
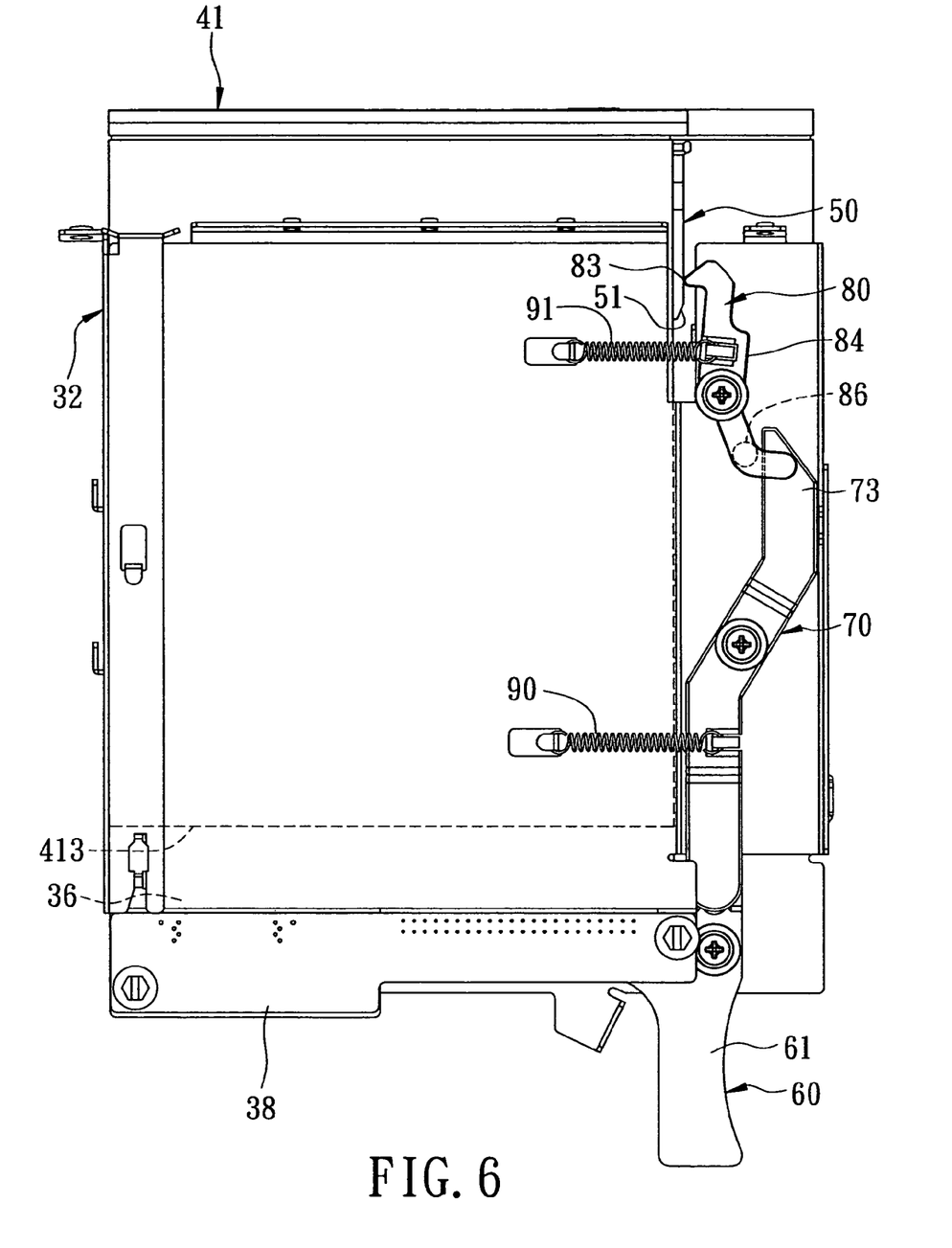
Figure 7:
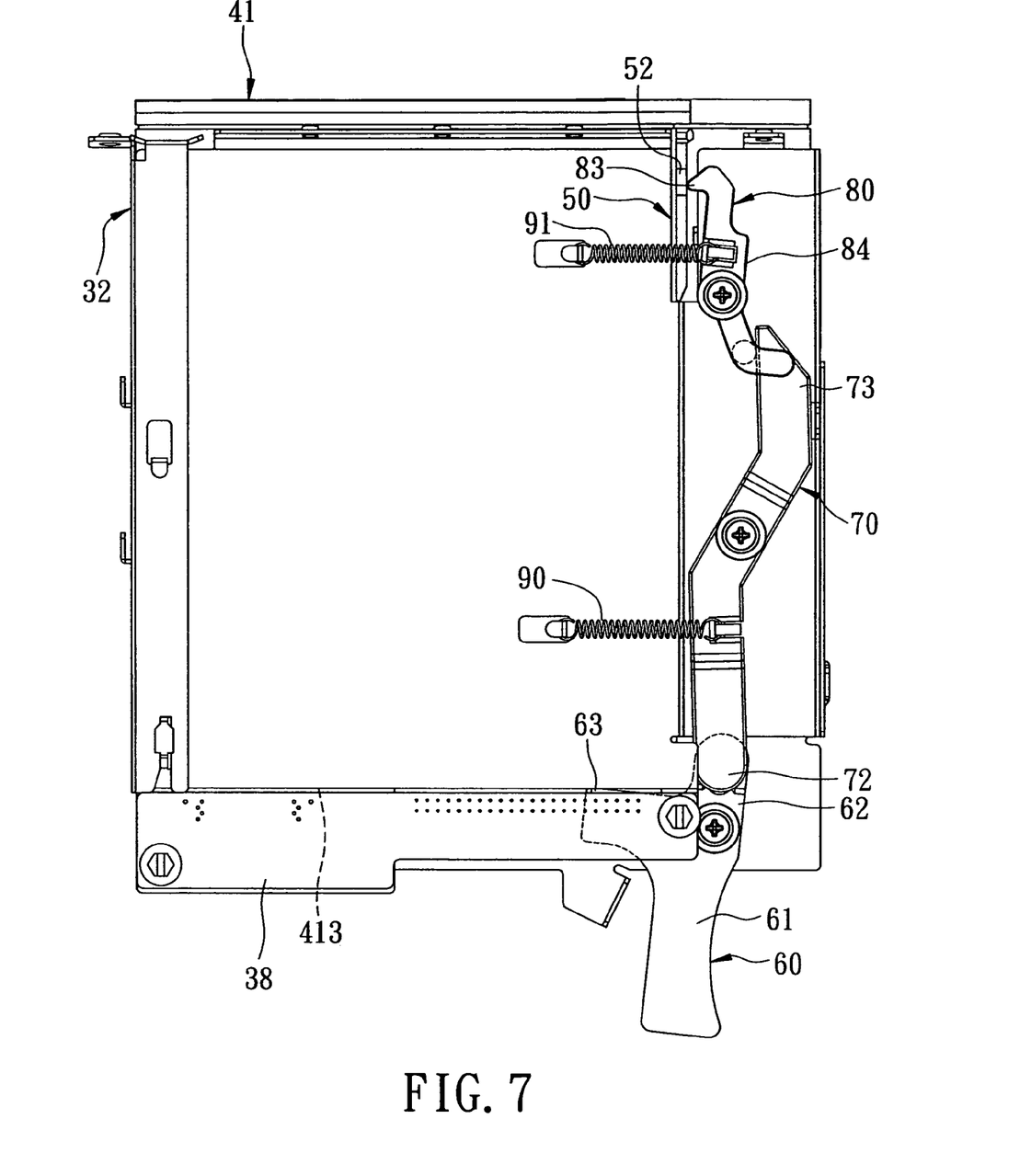
Figure 8:
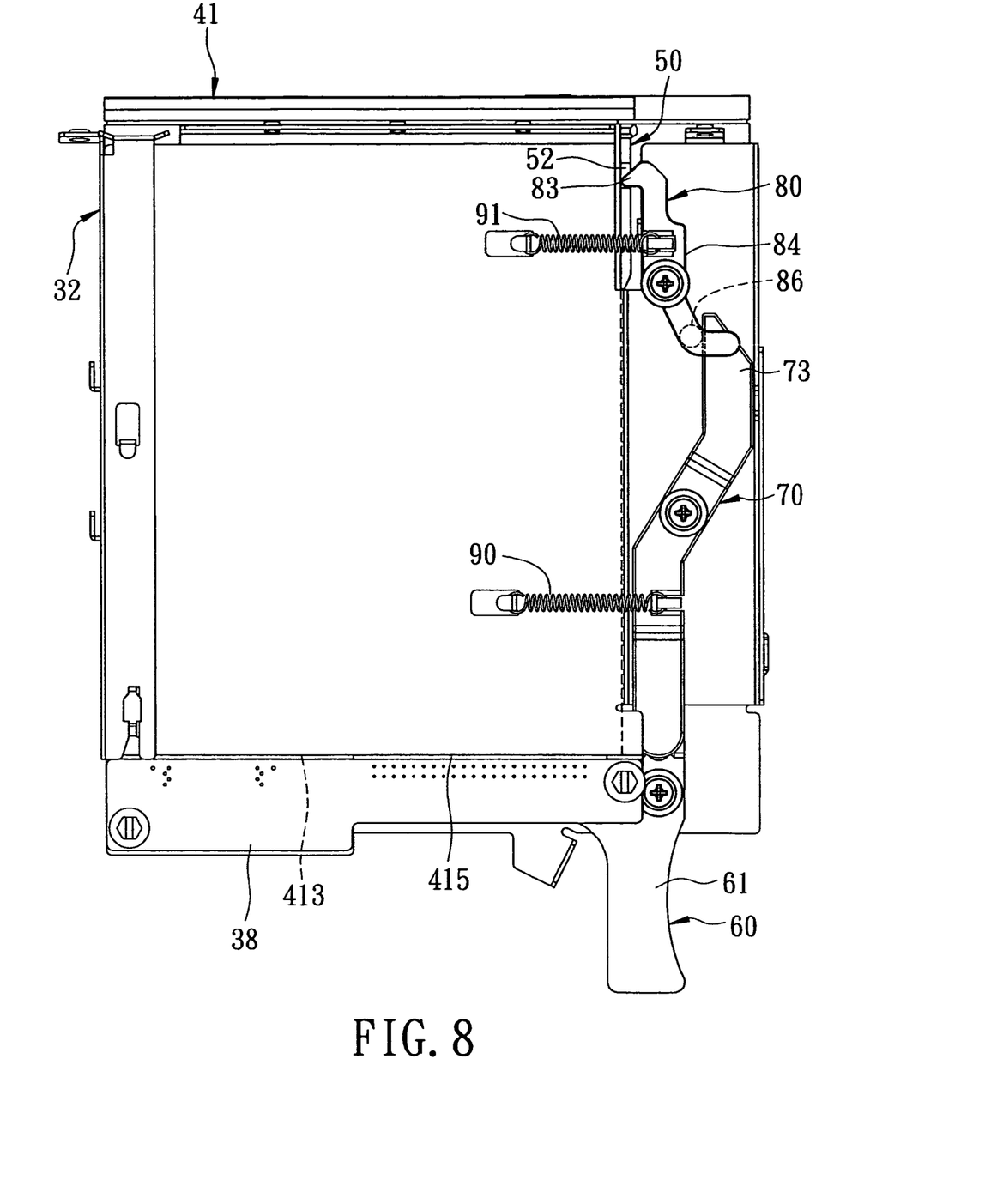

When it is desired to install the disk drive 41 in the electronic device 30, assuming that the disk drive casing 32 is already mounted on the disk drive bay of the electronic device 30, referring to FIG. 5, the rear end 413 (see FIG. 4) of the disk drive 41 is inserted into the accommodating space 36 in the disk drive casing 32 through the opening in the front end 301 of the electronic device 30 (see FIG. 4). During this time, referring to FIG. 6, the second interlocking member 83 is pushed by the end portion of the first latch member 50 and slides along the chamfer 51 of the end portion of the first latch member 50. This results in rotation of the pivot portion 84 of the second latch member 80 in the clockwise direction against the biasing action of the first biasing member 91 until the second interlocking member 83 is aligned with the first interlocking member 52, as best shown in FIG. 7. By the time the second interlocking member 83 is aligned with the first interlocking member 52, referring to FIG. 8, the terminal 415 of the disk drive 41 is connected to the electrical connector 38, and the pivot portion 84 of the second latch member 80, due to the biasing action of the first biasing member 91, rotates in the counter-clockwise direction, thereby resulting in extension of the second interlocking member 83 into the first interlocking member 52. Accordingly, the disk drive 41 is retained releasably in the accommodating space 36 in the disk drive casing 32.

Figure 9:
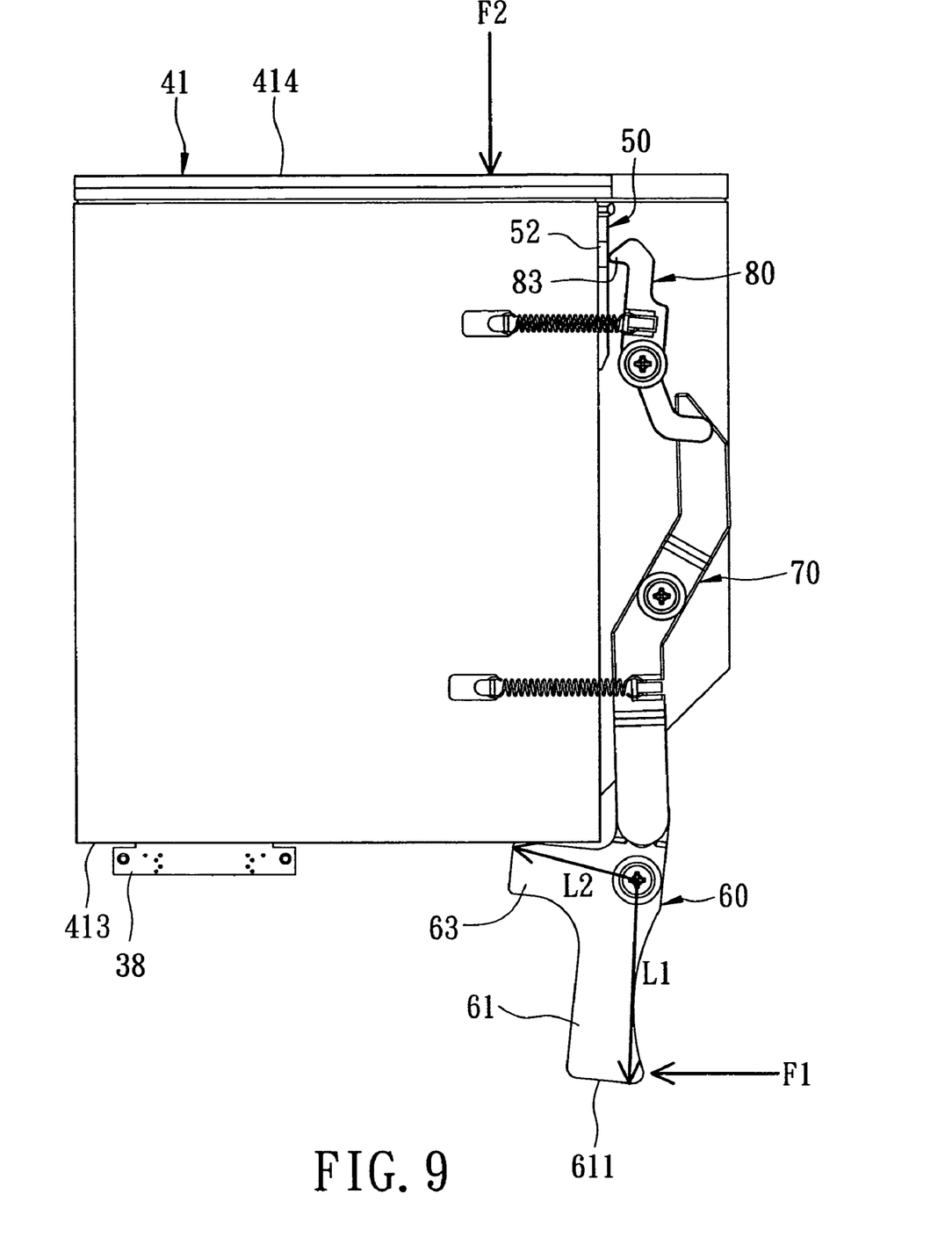
FIGS. 9 and 10 are schematic views to illustrate operation of the latch unit of the preferred embodiment during removal of the disk drive from the electronic device.
Figure 10:
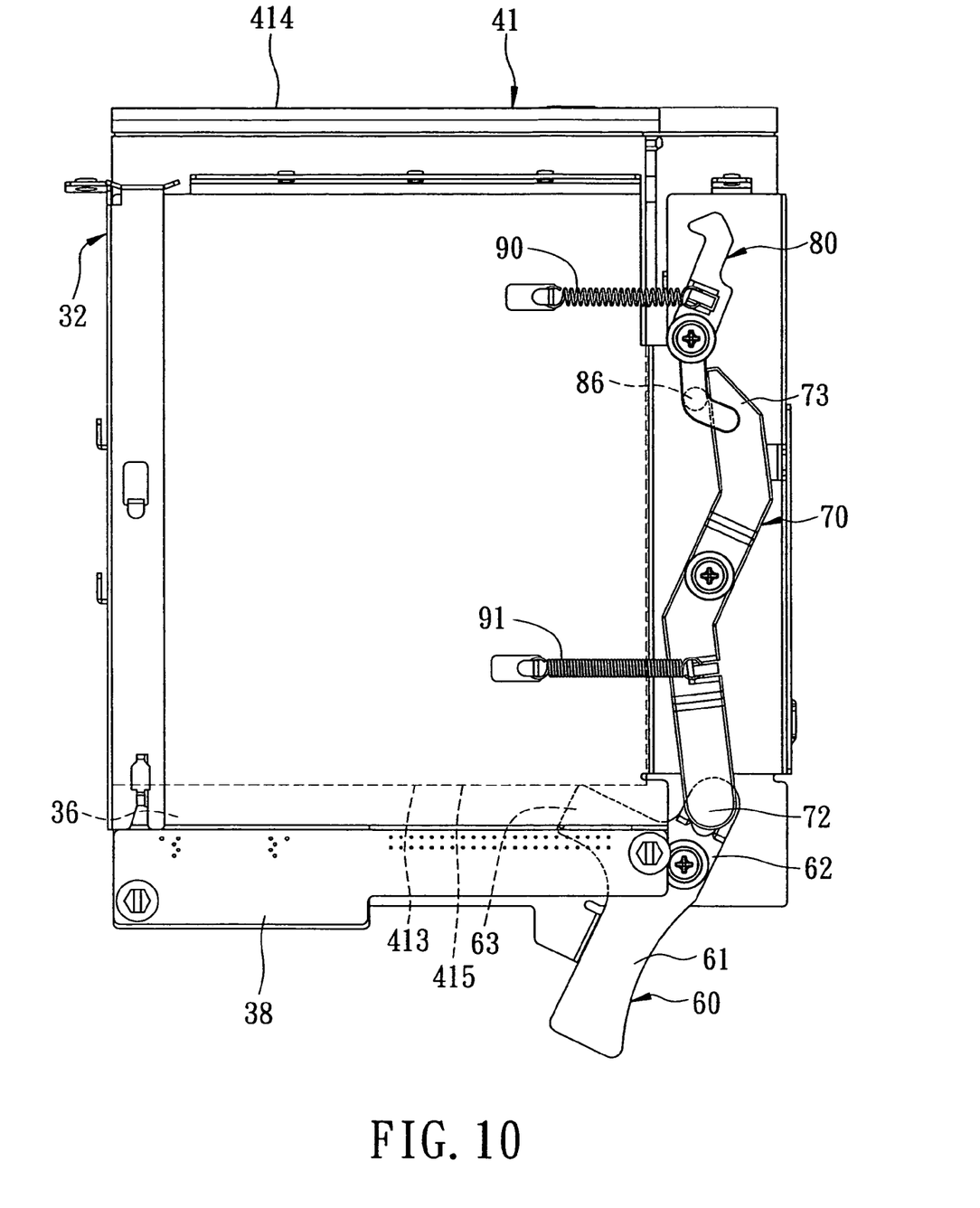

When it is desired to remove the disk drive 41 from the disk drive casing 32, referring to FIG. 9, the operating portion 61 of the operating member 60 is operated so as to rotate the pivot portion 62 of the operating member 60 in the clockwise direction. This results in rotation of the driving member 70 in the counter-clockwise direction and in rotation of the second latch member 80 in the clockwise direction, thereby disengaging the second interlocking member 83 from the first interlocking member 52. At the same time, the push portion 63 of the operating member 60 presses against the rear end 413 of the disk drive 41. Further operation of the operating portion 61 of the operating member 60, referring to FIG. 10, permits the push portion 63 of the operating member 60 to push the rear end 413 of the disk drive 41 such that the terminal 415 of the disk drive 41 is disconnected from the electrical connector 38, and such that the front end 414 of the disk drive 41 is disposed externally of the electronic device 30 through the opening in the front end 301 of the electronic device 30 (see FIG. 4).

It is noted herein that, as best shown in FIG. 9, the length (L1) of the operating portion 61 of the operating member 60 is longer than the length (L2) of the push portion 63 of the operating member 60. As such, the pushing force (F1) that is required to be applied to the operating portion 61 of the operating member 60 to disconnect the terminal 415 of the disk drive 41 from the electrical connector 38 is less than the applied pushing force (F2) on the disk drive 41 to connect the terminal 415 of the disk drive 41 to the electrical connector 38.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An apparatus for removably mounting a disk drive in an electronic device, the disk drive having a front end, and a rear end opposite to the front end thereof, the rear end having a terminal, said apparatus comprising:
   a disk drive casing configured and operable to receive the disk drive therein, said casing is configured to be mounted in the electronic device, said disk drive casing having a front end and a rear end;
   an electrical connector provided in said disk drive casing at said rear end thereof, said connector is operable to be electrically coupled to the terminal of the disk drive when the disk drive is received in said disk drive casing; and
   a latch unit operable for releasably retaining the disk drive in said disk drive casing, said latch unit comprising the disk drive being provided with a first latch member having a first interlocking member thereon;
   a second latch member mounted pivotally on said disk drive casing,
      said second latch member being rotatable relative to said disk drive casing between latched and unlatched positions,
      a second interlocking member formed on said second latch member and operable to releasably engage said first interlocking member when said electrical connector is connected to the terminal of the disk drive and when said second latch member is disposed at the latched position,
   a driving member having first and second driving end portions and a pivot portion disposed between said first and second driving end portions of said driving member, said pivot portion being mounted pivotably on said disk drive casing,
      said driving member being rotatable relative to said disk drive casing in a first rotational direction such that said first driving end portion of said driving member drives rotation of said second latch member from the latched position to the unlatched position, and
   an operating member having
      a pivot portion that is pivoted to said disk drive casing, and having connecting and push portions that extend in different directions from said pivot portion of said operating member,
      said connecting portion of said operating member being coupled to said second driving end portion of said driving member, said operating member further having an operating portion that extends from said pivot portion thereof and from said rear end of the disk drive casing for facilitating operation of said operating member, said push portion being configured to be disposed adjacent to the rear end of the disk drive when the disk drive is received in said disk drive casing, said operating member being operable to rotate in a second rotational direction opposite to the first rotational direction so as to drive rotation of said driving member in the first rotational direction such that said push portion of said operating member pushes the rear end of the disk drive so as to disconnect the terminal of the disk drive from said electrical connector.

2. The apparatus as claimed in claim 1, wherein said second latch member has first and second latch end portions, and a pivot portion that is disposed between said first and second latch end portions of said second latch member and that is mounted pivotally on said disk drive casing, said second interlocking member being formed on said first latch end portion of said second latch member, said second latch end portion of said second latch member having a stud that is pushed by and that slides along said first operating portion of said driving member when said driving member is rotated in the first rotational direction.

3. The apparatus as claimed in claim 1, wherein said latch unit further includes a biasing member for biasing said second latch member to the latched position.

4. The apparatus as claimed in claim 3, wherein said biasing member is a compression spring, and has a first end that is coupled to said first operating portion of said second latch member, and a second end that is opposite to said first end of said biasing member and that is coupled to said disk drive casing.

5. The apparatus as claimed in claim 1, wherein said latch unit further includes a biasing member for biasing said driving member in the second rotational direction.

6. The apparatus as claimed in claim 5, wherein said biasing spring is a compression spring, and has a first spring end that is coupled to said second operating portion of said driving member, and a second spring end that is opposite to said first end of said biasing spring and that is coupled to said disk drive casing.

7. The apparatus as claimed in claim 1, wherein said connecting portion of said operating member and said second operating portion of said driving member are coupled together in a tongue-and-groove arrangement.

8. The apparatus as claimed in claim 1, wherein said operating portion has a first length that is longer than a second length of said push portion of said operating member.

9. The apparatus as claimed in claim 2, wherein said disk drive casing includes opposite top and bottom casing parts that define an accommodating space therebetween for receiving the disk drive therein.

10. The apparatus as claimed in claim 9, wherein said operating member is mounted pivotally on said bottom casing part of said disk drive casing.

11. The apparatus as claimed in claim 9, wherein said second latch member is mounted pivotally on said top casing part of said disk drive casing.

12. The apparatus as claimed in claim 9, wherein said driving member is mounted pivotally on said top casing part of said disk drive casing.

13. An apparatus for removably mounting a disk drive in an electronic device, the disk drive having a front end, and a rear end opposite to the front end thereof, the rear end having a terminal, said apparatus comprising:

a disk drive casing configured and operable to receive the disk drive therein, said casing is configured and adapted to be mounted in the electronic device, said disk drive casing having a front and a rear end;

an electrical connector provided in said disk drive casing at said rear end thereof, said connector is operable to be electrically coupled to the terminal of the disk drive when the disk drive is received in said disk drive casing; and a latch unit operable for releasably retaining the disk drive in said disk drive casing, said latch unit comprising the disk drive being provided with a first latch member having a first interlocking member thereon;

a second latch member mounted pivotally on said disk drive casing, said second latch member being rotatable relative to said disk drive casing between latched and unlatched positions, a second interlocking member formed on said second latch member and operable to releasably engage said first interlocking member when said electrical connector is connected to the terminal of the disk drive and when said second latch member is disposed at the latched position, a driving member having first and second driving end portions and a pivot portion disposed between said first and second driving end portions of said driving member, said pivot portion being mounted pivotably on said disk drive casing, said driving member being rotatable relative to said disk drive casing in a first rotational direction such that said first operating portion of said driving member drives rotation of said second latch member from the latched position to the unlatched position, and an operating member having a pivot portion that is pivoted to said disk drive casing, and having connecting and push portions that extend in different directions from said pivot portion of said operating member, said connecting portion of said operating member being coupled to said second driving end portion of said driving member, said push portion being configured to be disposed adjacent to the rear end of the disk drive when the disk drive is received in said disk drive casing, said operating member being operable to rotate in a second rotational direction opposite to the first rotational direction so as to drive rotation of said driving member in the first rotational direction such that said push portion of said operating member pushes the rear end of the disk drive so as to disconnect the terminal of the disk drive from said electrical connector.

* * * * *